United States Patent Office 3,730,761
Patented May 1, 1973

3,730,761
COATING OF METALS
Frank Smith, Runcorn, England, assignor to Imperial Chemical Industries Limited, London, England
No Drawing. Continuation-in-part of application Ser. No. 843,242, July 18, 1969. This application Jan. 7, 1971, Ser. No. 104,733
Claims priority, application Great Britain, Aug. 9, 1968, 38,107/68
Int. Cl. C23c 1/00
U.S. Cl. 117—131                        4 Claims

ABSTRACT OF THE DISCLOSURE

A sheet of titanium, zirconium or tantalum is coated with tinning metal by heating the sheet while the surface to be coated is covered with the tinning metal in the molten state and moving an ultrasonically-excited probe over the surface, with the probe being in contact with the surface and with the molten metal.

---

This is a continuation-in-part of application Ser. No. 843,242, filed July 18, 1969 and now abandoned.

This invention relates to a method of coating a sheet of titanium, zirconium or tantalum (or an alloy of one of the said metals) with a "tinning" metal or alloy and to a method of bonding the coated sheet to a steel sheet.

The invention finds particular application in the production of a laminate comprising a sheet of titanium, zirconium or tantalum (or an alloy thereof) bonded to a sheet of mild steel, the said laminate being suitable for use as an electrode in an electrolytic diaphragm cell.

The presence of an oxide layer on the surface of the sheet of titanium, zirconium or tantalum prevents the surface from being readily wetted by a "tinning" metal or alloy, and thus these metals are not easily soldered to other metals such as steel. It is usually necessary to pre-clean the surface to remove the oxide, for example by pickling in a strong acid. The pre-cleaned sheet may then be bonded to a steel sheet by, for example, electroplating with copper or electroless-plating with nickel, followed by soldering in a known manner.

We have now found that a sheet of titanium, zirconium or tantalum (or an alloy thereof) may be coated with a "tinning" metal or alloy using a method which avoids the necessity of pre-cleaning or of electroplating or electrolessplating before soldering.

Thus according to one aspect of the present invention there is provided a method of coating a sheet of titanium, zirconium or tantalum (or an alloy of one of the said metals) with a "tinning" metal or an alloy which comprises heating the said sheet in the range 350° C.–450° C. whilst the surface to be coated is covered with the "tinning" metal or alloy in the molten state, immersing an ultrasonically-excited probe in the molten metal and moving the probe over substantially the whole of the surface to be coated, the said probe being in contact with the said surface and with the molten metal or alloy. Sheets as large as 1 square meter in area have been coated by this method.

The "tinning" metal or alloy may be tin or an alloy thereof or any other metal or alloy of the type used for coating a metal surface in preparation for soldering.

The coated sheet thus obtained may then be bonded to a pre-tinned steel sheet by a conventional process of soldering.

Thus according to another aspect of the present invention there is provided a method of making a laminate by bonding a sheet of titanium, zirconium or tantalum (or an alloy of one of the said metals) to a steel sheet, which comprises the steps of:

(i) Coating the sheet of titanium, zirconium or tantalum (or an alloy of one of the said metals) with a tinning metal or alloy by the method hereinbefore defined and
(ii) Soldering the coated sheet thus obtained to a pre-tinned steel sheet.

The tinning metal or alloy used to coat the sheet of titanium, zirconium or tantalum (or an alloy thereof) may be the same as or different from the tinning metal or alloy used in pre-tinning the steel sheet.

A wide range of tinning metals or alloys may be used, although the alloys are to be distinguished from conventional solders, because the latter cannot be made to coat titanium, zirconium or tantalum. Suitable tinning metals include tin, zinc and cadmium. Suitable tinning alloys include binary alloys of tin with minor proportions of zinc, lead, antimony or bismuth and ternary tin-coating alloys, for example a tin/zinc/lead alloy wherein lead is the minor component. It is preferred to use a zinc/tin alloy.

The pre-tinning of the steel sheet may conveniently be carried out in the conventional manner by heating the surface to be bonded with a lead/tin alloy, for example an alloy containing 30% lead, 70% tin. Alternatively, a lead/bismuth alloy may be used.

A wide range of alloys may be used for soldering the coated sheet of titanium, zirconium or tantalum (or an alloy thereof) to the pre-tinned steel sheet; suitable soldering alloys include, for example, lead/tin alloys or lead/bismuth alloys.

When the coating process described herein is applied to an alloy of titanium the alloy may be, in particular, an alloy having polarisation properties comparable with those of titanium. Examples of such alloys include titanium/zirconium alloys containing up to 14% of zirconium, alloys of titanium with up to 5% of a platinum metal such as platinum, rhodium or iridium, and alloys of titanium with niobium or tantalum containing up to 10% of the alloying constituent.

The temperature at which the sheet of titanium, zirconium or tantalum (or an alloy thereof) is coated with the tinning metal or alloy should be in the range from 350° C. to 450° C., for example from 380° C. to 410° C., because if the temperature is below about 350° C., coating does not take place.

The ultrasonic probe may be of conventional design resonating, for example, at a frequence of approximately 20 K./cs.

The coating may conveniently be carried out by providing the sheet to be coated with a wall to form a dam surrounding the area to be coated and heating the sheet from underneath. The dam is then filled by melting a tinning metal or alloy onto the hot sheet. An ultrasonically-excited probe is dipped into the molten metal or alloy until it comes into contact with the surface of the sheet to be coated and the probe is then moved so as to contact substantially the whole of the surface enclosed within the dam whilst keeping the probe immersed in the molten metal or alloy. The probe is then removed and the surplus metal or alloy drained from the sheet. The treated area is partially-scraped so as to leave only a thin film of metal or alloy bonded to the sheet.

The bonding of the coated sheet of titanium, zirconium or tantalum (or an alloy thereof) to a pre-tinned steel sheet may conveniently be carried out by first melting a layer of a lead/tin or a lead/bismuth alloy onto the coated sheet, and coating the steel sheet with the same alloy. After cooling, the coated sheets are pressed together and heated to express any excess alloy and to complete the bonding operation. The bonded plates are then allowed to cool whilst still under load. For continuous operation the assembled plates may be bonded by passing them through consecutive heating and cooling zones.

The invention is illustrated, but not limited by the following examples:

EXAMPLE 1

A 20 gauge titanium sheet (thickness 0.036 inch) was provided with a wall (⅛ inch deep) to form a dam surrounding the area to be bonded to the steel plate. The titanium sheet was placed on a hot-plate, with the surface to be treated uppermost, and heated from beneath to about 380° C.–410° C. A zinc/tin alloy (25% zinc, 75% tin) was added to the dam until the alloy after melting just filled the dam. An ultrasonically-excited probe, consisting of a half wave-length resonant steel probe (having a natural frequency of 20K./cs.) coupled to a magnetostriction transducer, was dipped into the molten alloy until it came into contact with the titanium surface. The probe was then moved from side to side, whilst keeping the probe in contact with the surface and whilst keeping it immersed in the molten alloy, until the whole of the surface had been contacted. The probe was then removed and the surplus alloy drained from the sheet. After cooling, the treated area was scraped with a flat bar so as to leave only a thin film of alloy bonded to the sheet.

The tinned titanium sheet was placed on a hot-plate, with the tinned surface uppermost, and heated to about 200° C. A layer of lead/tin alloy (30% lead, 70% tin) was melted onto the sheet.

A mild steel sheet was similarly coated with a layer of lead/tin alloy (30% lead, 70% tin) at about 200° C.

After cooling the two sheets, the steel was placed with its tinned surface uppermost and the tinned titanium sheet was placed thereon. A load was applied to press the two sheets together and the loaded assembly was then placed in a furnace at a temperature of 200° C. Excess alloy was expressed under load and the assembly allowed to cool.

After cooling, the bonded assembly was tested by subjecting the plates to a force tending to pull the plates apart. A force of 600–700 lb./sq. inch was required to break the bond between the titanium and the mild steel.

Similar results were obtained using the following alloys to coat the titanium sheet:

99% tin—1% zinc
99% tin—1% lead
99% tin—1% antimony
99% tin—1% bismuth and also by using tin or zinc as the tinning metal.

EXAMPLE 2

The conditions of Example 1 were repeated using a 20 gauge zirconium sheet and a zinc/tin alloy (25% zinc, 75% tin) to coat the zirconium sheet.

A force of 1275 lb./sq. inch was required to break the bond between the zirconium and the mild steel.

EXAMPLE 3

The conditions of Example 1 were repeated using a 20 gauge tantalum sheet and a zinc/tin alloy (25% zinc, 75% tin) to coat the tantalum sheet.

A force of 1600 lb./sq. inch was required to break the bond between the tantalum and the mild steel.

COMPARATIVE EXAMPLES

EXAMPLE 4

The conditions of Example 1 using a 20 gauge titanium sheet and a zinc/tin alloy (25% zinc/75% tin) except that the coating procedure was carried out at a temperature of 300° C. At this temperature, it was found that the titanium sheet could not be coated with the zinc/tin alloy.

EXAMPLE 5

The conditions of Example 1 using a 20 gauge titanium sheet were repeated using a lead/tin alloy (70% lead/ 30% tin; so-called "Plumbers solder") at 400° C. instead of the zinc/tin alloy. It was found that the titanium sheet could not be coated with the lead/alloy.

What we claim is:

1. A method of coating a sheet of a metal selected from the group consisting of titanium, zirconium, tantalum and an alloy of one of these metals with a tinning metal selected from the group consisting of tin, zinc, cadmium and binary and ternary alloys which contain at least 70% of these metals, said method comprising: covering the surface to be coated with said tinning metal in the molten state; simultaneously heating said sheet to a temperature in the range 350° C. to 450° C.; immersing an ultrasonically-excited probe in the molten metal; and moving the probe over substantially the whole of the surface to be coated, said probe being in contact with the said surface and with the molten metal.

2. A method as in claim 1 wherein the steps of covering the surface with molten metal and heating the sheet are effected by providing a dam surrounding said surface, heating the sheet from below and melting the tinning metal onto the heated surface.

3. A method as in claim 1 wherein the tinning metal is a 25% zinc/75% tin alloy.

4. A method as in claim 1 wherein the sheet is heated to a temperature in the range 380° C. to 410° C.

References Cited

UNITED STATES PATENTS

| | | | |
|---|---|---|---|
| 2,397,400 | 3/1946 | Barwich | 29—504 X |
| 2,426,650 | 9/1947 | Swain | 29—504 X |
| 2,555,001 | 5/1951 | Ohl | 29—504 X |
| 2,957,112 | 10/1960 | Sils | 29—504 X |
| 3,217,405 | 11/1965 | Das | 117—114 X |
| 3,266,136 | 8/1966 | Guther | 29—492 X |
| 2,895,845 | 7/1959 | Jones et al. | 117—131 X |

FOREIGN PATENTS

| | | | |
|---|---|---|---|
| 548,330 | 10/1942 | Great Britain | 29—492 |

OTHER REFERENCES

Semi-Alloy High Purity Precision Alloys Technical Bulletin No. SA–64, July 22, 1968.

J. SPENCER OVERHOLSER, Primary Examiner

R. J. SHORE, Assistant Examiner

U.S. Cl. X.R.

29—502, 503; 117—DIGEST 8